United States Patent [19]

Shirakabe et al.

[11] Patent Number: 5,136,709
[45] Date of Patent: Aug. 4, 1992

[54] METHOD FOR GENERATING AN OPERATING SYSTEM BY A STATIC LINK-EDITOR

[75] Inventors: Yoshihisa Shirakabe, Kunitachi; Megumu Kondo, Kawasaki; Yoshitake Nakaosa, Yokohama; Hidenori Yamada; Sadao Ohashi, both of Hadano; Hideo Ohchi, Kanagawa, all of Japan

[73] Assignees: Hitachi, Ltd.; Hitachi Computer Engineering Co., Ltd., both of Tokyo, Japan

[21] Appl. No.: 280,832

[22] Filed: Dec. 7, 1988

[30] Foreign Application Priority Data

Dec. 11, 1987 [JP] Japan .................................. 62-312011

[51] Int. Cl.⁵ .................................................. G06F 9/45
[52] U.S. Cl. .............................. 395/700; 364/DIG. 1; 364/280; 364/280.4; 364/280.9; 364/DIG. 2; 364/973; 364/976
[58] Field of Search ... 364/200 MS File, 900 MS File; 395/700

[56] References Cited

U.S. PATENT DOCUMENTS

| | | |
|---|---|---|
| 4,589,063 | 5/1986 | Shah et al. .......................... 364/200 |
| 4,649,479 | 3/1987 | Advani et al. ....................... 364/300 |
| 4,768,150 | 8/1988 | Chang et al. ........................ 364/300 |
| 4,779,187 | 10/1988 | Letwin .................................. 364/200 |
| 4,787,034 | 11/1988 | Szoke ................................... 364/200 |

OTHER PUBLICATIONS

Harry Tennant, *Linking and Loading*, Bits and Pieces—Byte Books, vol. 4 (1979): 77–87.
S. E. Madnich & J. J. Donovan, "Operating Systems", published McGraw-Hill, 1974, pp. 173–176, (Provided in English).

Primary Examiner—Gareth D. Shaw
Assistant Examiner—Paul Kulik
Attorney, Agent, or Firm—Fay, Sharpe, Beall, Fagan, Minnich & McKee

[57] ABSTRACT

In an operating system generation method of a computer, a symbolic name is converted into an identification code, which is further converted into an address. This enables an inter-reference operation to be achieved between a kernel and input/output device drivers, thereby independently generating the input/output device drivers and the kernel. As a result, depending on the hardware configuration of the user system, input/output device drivers can be incorporated into the operating system.

2 Claims, 7 Drawing Sheets

METHOD FOR GENERATING AN OPERATING SYSTEM BY A STATIC LINK-EDITOR

BACKGROUND OF THE INVENTION

The present invention relates to an operating system of a computer, and in particular, to an operating system generation method in which input/output device control programs can be incrementally added to an operating system.

An operating system (to be abbreviated as an OS herebelow) includes a basic portion of the operating system (to be abbreviated as a kernel herebelow) serving basic functions of the operating system such as process management, memory management and input/output device control programs (to be referred to as input/output device drivers herebelow) for controlling input/output devices connected as peripheral devices. An operating system includes only one kernel, whereas a plurality of drivers are provided in association with the respective input/output devices.

In general, as the number of input/output devices connected to the computer increases, there appears an increased number of different types of drivers. In addition, since different types of input/output devices are connected to the various computer systems for the respective users, the combination of the drivers included in the operating system varies between user systems. Consequently, a procedure is required to incorporate the driver into the operating system depending on the hardware constitution of the user system.

When a driver is incorporated into an operating system, there arises a necessity of mutual reference between the driver and the kernel of the operating system for control of the input/output devices. The mutual reference is effected through three types of operations as follows:

(1) Routine call from the kernel to the driver;
(2) Routine call from the driver to the kernel; and
(3) Reference to data from the driver to the kernel.

When a user program issues an input/output request, the kernel calls a driver routine associated with the request, which corresponds to (1) above.

On the other hand, at an execution of an input/output operation, the driver routine calls the kernel routine to effect processing which can be controlled only by the kernel, which corresponds to (2) above. In addition, the driver routine references data managed by the kernel such as an address of data and a data length of data associated with the input/ output operation, which corresponds to (3) above.

When incrementally adding a driver to the operating system, the mutual reference between the kernel and the driver is required to be enabled. In general, a source program of the kernel or the driver is described by use of a symbolic name and also in a case of the mutual reference. On the other hand, in an object program or a program in an object form at an execution, all symbolic names are required to be translated into absolute addresses. When incorporating a driver into the operating system, there arises a problem of a method to translate the symbolic names to be subjected to the mutual reference between the kernel and the driver, which is referred to as a problem of an address solution herebelow.

Heretofore, there have been employed two methods of incorporating a driver in an operating system, namely, a static link method and a dynamic link method.

Figure 2:
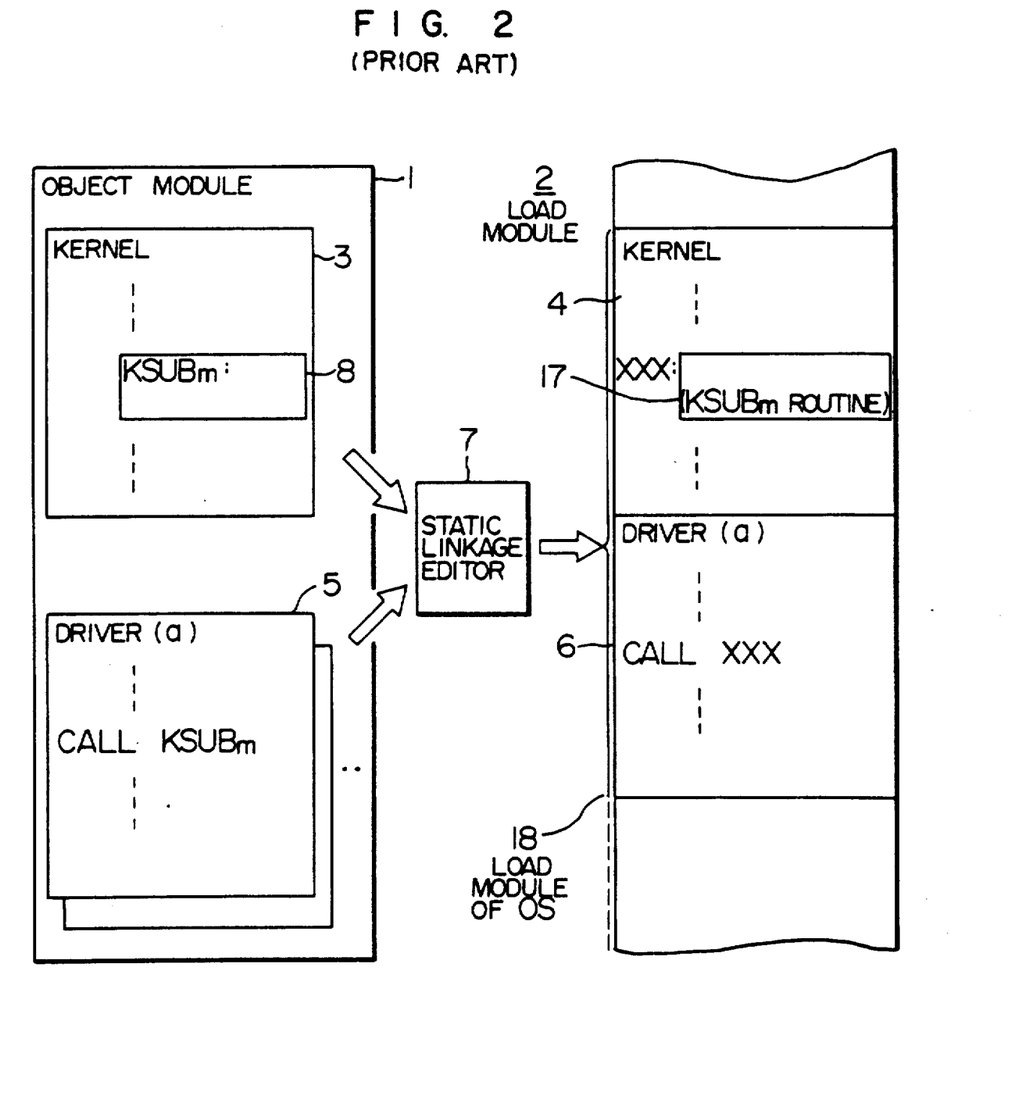
FIG. 2 is an explanatory diagram useful to explain the static link method.

FIG. 2 shows the static link method in which a driver 5 calls a routine "KSUBm" in a kernel 3. When the driver 5 is linked with an object module 1 of the kernel 3 by use of the static linkage editor 7 (which is an ordinary linkage editor, namely, "static" is added thereto only for discrimination from another prior art technology of FIG. 3), a load module 18 is generated. The contents of the load module 18 thus produced include a load module 4 of the kernel 3 and a load module 6 of the driver 5, which are however combined into an integrated load module 18 of the operating system. In the load module 18, an address (XXX) of a "KSUBm" routine 17 is inserted into a location where this routine 17 is to be called (in an operand of a CALL instruction in the driver (a) 6). As described above, according to the static link method, the address solution between the kernel and the driver is accomplished when the link edit operation is conducted. This is because that since all object modules (that is, the kernel 3 and the driver 5 are simply object modules in FIG. 2, and this notification does not imply that the kernel and the driver exist in the same module and applies to all other drawings) of the drivers requiring the kernel are linked by use of the linkage editor 7, the absolute address (XXX in the example above, which is not necessarily a physical address) of the symbolic name (KSUBm in this example) to be subjected to the mutual reference can be completely recognized by the linkage editor 7.

Figure 3:
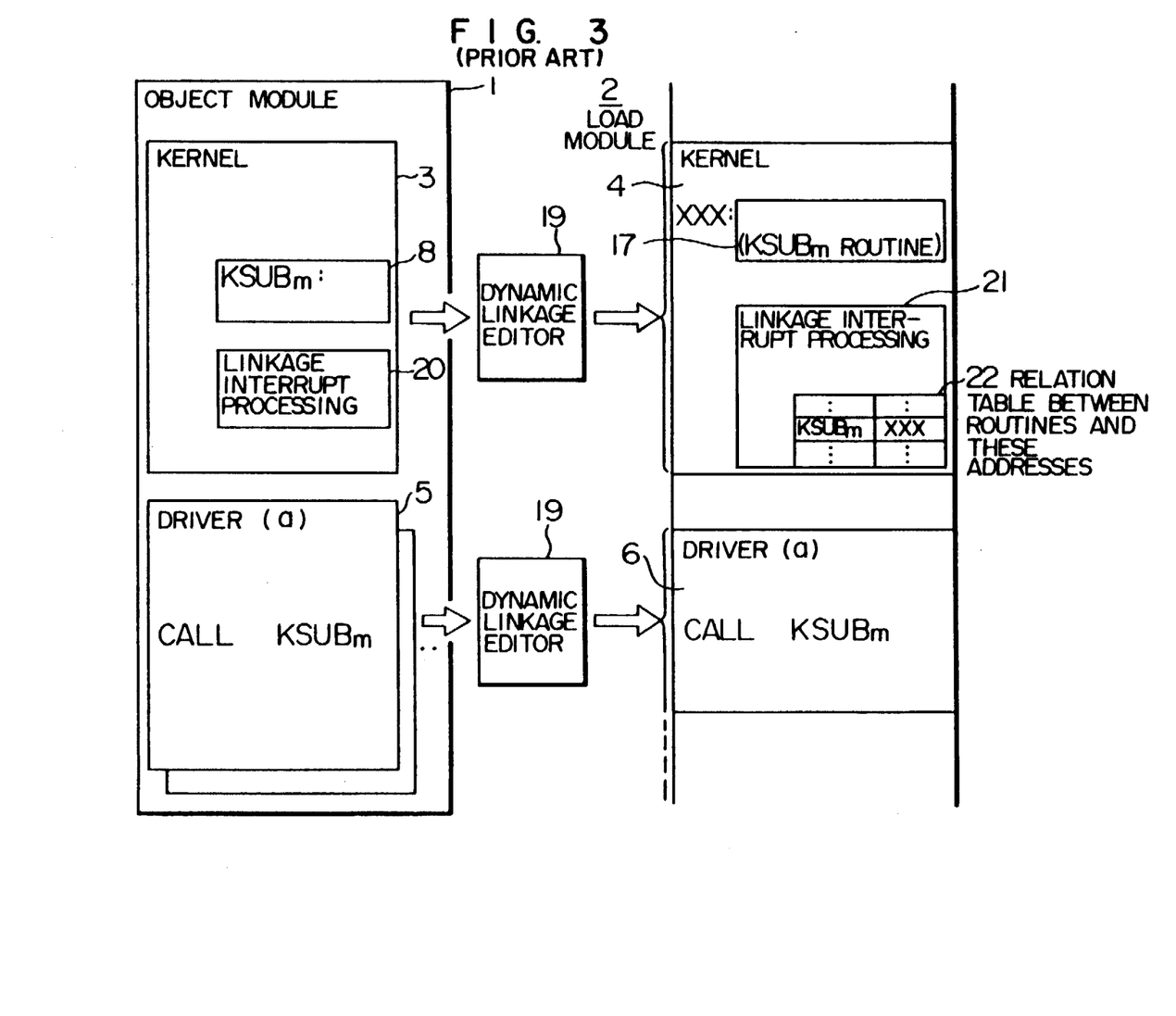
FIG. 3 is an explanatory diagram useful to explain the dynamic link method.

The dynamic link method has been described in pages 173 to 176 of the "Operating Systems" written by S. E. Madnick, J. J. Donovan and published from McGraw-Hill in 1974. Referring now to FIG. 3, the address solution of the dynamic link method will be described.

In the dynamic link method, the kernel 3 and the driver 5 are not linked into a load module by use of a dynamic linkage editor 19, namely, there are produced segments 4 and 6 which are mutually independent of each other. In FIG. 3, a portion where the driver 5 calls a routine "KSUBm" in the kernel 3 retains the symbolic name "KSUBm" is retained (in the driver 6 of FIG. 3), this is true also after the processing of the linkage editor 19 for the dynamic link is accomplished. When the symbolic name "KSUBm" is referenced during an execution of the driver 6, a linkage interruption occurs in the kernel 4. A linkage interruption processing routine 21 of the kernel 4 possesses a relation table between routines and these addresses 22 including correspondences between the routine names related to the symbolic names and addresses thereof. When the linkage interruption occurs, an address (XXX) corresponding to the routine name "KSUBm" is passed to the driver 5, which in turn calls the "KSUBm" routine 17 by use of the address (XXX).

In this fashion, according to the dynamic link method, the symbolic name is retained up to the execution so as to effect the address solution at the execution.

The method to incorporate a driver in an operating system according to the prior art technology is attended with the following problems.

In general, the kinds of input/output devices connected to a computer are desired to be changed depending on the utilization situation of the computer. For this purpose, there is required means which enables the user to incrementally add a driver to the operating system in accordance with the utilization condition of the computer.

However, in the static link method described with reference to FIG. 2, it is impossible to add a new driver to the operating system which is a load module for the following reason. That is, in this method, the linkage editor 7 translates, in the link edit operation, symbolic names subjected to the mutual reference between the kernel 3 and the driver 5 into addresses so as to generate an operating system 18 as an executable load module. In other words, it is impossible for the conventional linkage editor 7 to add a new driver to the operating system 18 in the load module format for which the address solution has already been completed so as to achieve the address solution for a symbolic name to be subjected to the mutual reference thereafter. In consequence, in order to accomplish the user's request for the addition of a driver, it is necessary to achieve the link edit operation again for the object module 1 of the kernel 3 and other drivers, or to prepare various kinds of operating systems 18 for respective combinations of the drivers. However, in general, the user cannot obtain the object module 1 of the kernel 3 and other drivers 5. Moreover, when the utilization situation of the computer in the future cannot be forecasted, the combinations of the drivers cannot be easily determined in advance.

On the other hand, according to the dynamic link method described with reference to FIG. 3, the address solution is accomplished on the symbolic names for which the mutual reference is effected between the kernel 3 and the driver 5 during the execution of the operating system 18; in consequence, it is possible to add a driver to the operating system 18. However, in order to implement this method, the following two items are essential as described above:

(1) Special compiler and linkage editor capable of generating a plurality of segments and of retaining symbolic names also after the processing.

(2) Hardware causing a linkage interruption when a symbolic name is referenced.

However, an ordinary computer is not provided with such special software and hardware, therefore the dynamic link method cannot be adopted.

As described above, in the driver incorporation method of the prior art technology, there exists a problem that a driver cannot be added to the operating system depending on the change in the kind of the input/output device connected to the computer.

SUMMARY OF THE INVENTION

It is therefore an object of the present invention to provide an operating system generation method which is capable of incrementally adding a driver to an operating system by use of the same ordinary software as that used in the static link method and not employing special hardware and software necessitated in the dynamic link method.

The object above is achieved as follows, namely, a symbolic name in the kernel referenced by a driver is assigned with an identification code such as a number so that the symbolic name is translated into the identification code when the driver is compiled such that the driver specifies the identification code when the computer is initiated or at an execution so as to obtain an address corresponding to the symbolic name in the kernel.

On the other hand, the object is also achieved as follows, namely, another identification code is assigned to the driver such that the kernel specifies the identification code at an initiation of the computer so as to attain an address corresponding to the symbolic name in the driver referenced by the kernel.

With the provisions above, the linkage between the kernel and the driver is established and hence a driver can be incrementally added to the operating system.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Referring to the drawings, description will be given of an embodiment according to the present invention.

Figure 1:
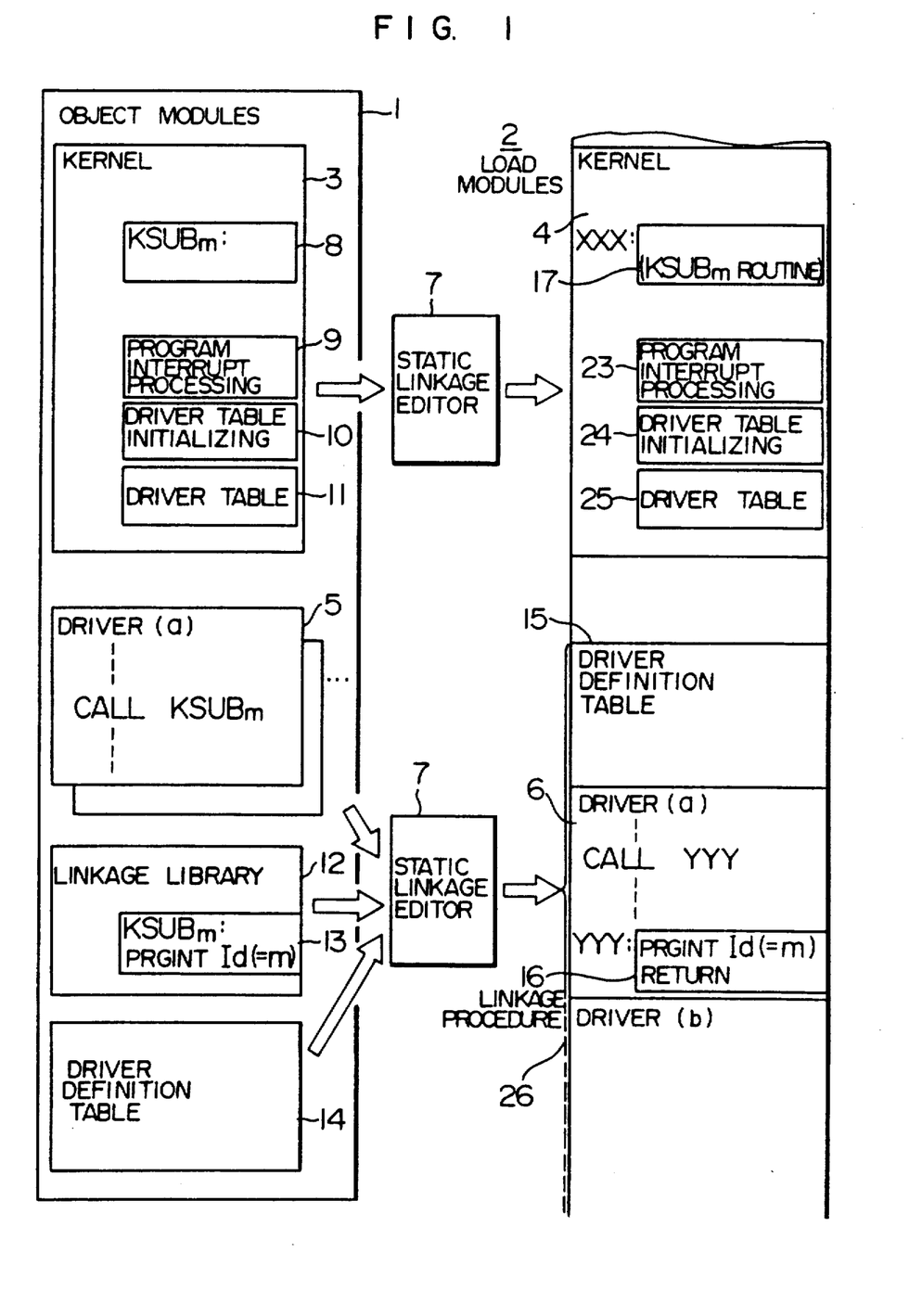
FIG. 1 is a schematic diagram showing an embodiment of the address solution method between a driver and a kernel according to the present invention.

FIG. 1 shows a configuration diagram of an embodiment of the address solution according to the present invention.

Object modules 1 consisting of programs and tables necessary for constituting the kernel 3, the driver 5, and other operating system components are subjected to a linkage by use of the static linkage editor 7 so as to generate two load modules 2, a load module 4 primarily including a kernel, and a load module 26 mainly comprising a new driver to be added.

In order to explain the present invention, the kernel 3 includes a routine "KSUBm" 8 to be called from the driver 5, a program interrupt processing routine 9 operative in response to a program interruption issued at an execution of the driver 5, a driver table 11 for storing therein addresses of the load module 6 of the driver 5, and a driver table initializing routine 10 for storing addresses in the driver table 11. The other routines and tables are omitted for simplification of the diagram, which also applies to the configurations in the other drawings.

In the kernel 3, a representative routine not shown is a driver included as the basic routine of the operating system, for example, a driver for a keyboard.

As described above, the object module of the kernel 3 is linked by the linkage editor 7 so as to generate a load module 4 of the kernel.

The static linkage editor 7 is a linkage editor quite commonly used in general and is identical to the static linkage editor 7 of FIG. 2. This is ordinarily simply called a linkage editor, and hence a term "linkage editor" is used in the following description.

The load module 4 of the kernel includes, like the object module of the kernel 3 thereof, "KSUBm" 17, the program interrupt processing 23, routines of the driver table initializing routine 24, and the driver table 25. Naturally, these routines and tables are translated into a load module, namely, an execution format so as to operate in an integral fashion with other portions of the load module 4 of the kernel.

The object module the driver 5 is linked with the linkage library 12 and the driver definition table 14 by the linkage editor 7, thereby generating the load module 26. In FIG. 1, there is shown a state where a plurality of drivers 6 including drivers (a), (b), etc. are to be added to the operating system.

In FIG. 1, two linkage editors 7 are shown, which does not necessarily mean that two editors 7 exist but that the load module 4 of the kernel and the load module 26 mainly including the driver 6 are separately generated by use of the linkage editor 7.

When the load module 26 is generated, the linkage library 12 extracts only a portion 13 required by the driver 6 such that the pertinent portion is incorporated in the driver 6 according to the execution format (16 of FIG. 1).

As described above, according to the present invention, since the kernel and the driver are separately linked by use of the linkage editor so as to generate the separate load modules, the kernel need not be linked again when a new driver is added, which facilitates the operation to add the new driver. In general, it is difficult for the user to obtain the object module of the kernel. Under this situation, according to the present invention, the user can easily attain an operating system of a computer system including desired input/output devices.

The load module 4 mainly including the kernel, and the load module 26 primarily including the driver 6 thus generated are required to, when used as the operating system in the main memory, operate in an integrated fashion by mutually using routines and data respectively contained therein. Details about the operations above will be next described with reference to three cases thereof.

(1) When a routine in the kernel is called from the driver

Description will be given of a case where in the driver 5 of FIG. 1, the "KSUBm" routine 8 in the kernel 3 is called by use of a procedure of CALL KSUBm (also in an object module, 0 is inserted in general in place of "KSUBm" as an undefined address; however, by use of an external reference table associated with the object module, it is known that the called routine is "KSUBm"). It is assumed that in the load module 4 of the kernel, the "KSUBm" routine 17 is allocated with the first address thereof set as "XXX". In general, load modules are generated in a memory device such as a magnetic disk, however, the address "XXX" does not indicate an address in such a memory device, namely, it indicates an address in the memory (main memory) in which the operating system is loaded at an execution.

On the other hand, in the load module 26 mainly including the driver 6, there is contained only a portion of the linkage library 12 necessary to call the "KSUBm" routine, which is the linkage procedure 16 of FIG. 1. The procedure to call the "KSUBm" routine of the driver 6, includes setting an address (YYY) to the operand thereof. The address "YYY" is the first address of the linkage procedure 16, that is, when CALL YYY in the driver 6 is executed, the linkage procedure 16 starts the operation thereof.

The operation of the linkage procedure 16 will be described with reference to FIG. 4. In step 40, it is judged to determine whether or not the first address of the routine ("KSUBm" in this case) corresponding to Id=m has already been known in the linkage procedure 16. This judgment is conducted according to whether or not the address of "KSUBm" has already been set to a work area WKm in the linkage procedure 16. If the address has been known, control is passed to step 46; otherwise, a program interrupting instruction (pigment) is issued. In this case, m is used as a parameter for the identification code (Id). In association with the issuance of the program interrupting instruction, control is transferred to the program interrupt processing in the kernel of the load module 4, which will be described later. As a result of the operation thus effected, namely, as return information, the first address (XXX) of the "KSUBm" routine 17 is passed to the linkage procedure 16. The address (XXX) is then set to the work area WKm (step 44). In the step 46, a jump to subroutine instruction is employed to cause the "KSUBm" routine 17 at the address (XXX) to start an operation. After the operation of the "KSUBm" routine 17 is finished, the linkage procedure 16 executes a return instruction so as to execute an instruction subsequent to the CALL YYY of the driver 6.

As described above, by use of the load module 26 containing the driver 6 thus separately generated, the routine in the load module 4 of the kernel 3 can be called.

Next, description will be given of another feature of the operation described above. Of the operations effected by the linkage procedure 16, the operation to attain the address (XXX) of the "KSUBm" routine 17 in the kernel of the load module 4 can be effected through one execution of the processing of the step 40 of FIG. 4 as described above. (In general, since there exists a large overhead in association with an issuance of the program interrupting instruction, the fact that the operation above can be effected through one execution of the step 40 means that the overhead is minimized and hence the processing speed is improved.) However, in a computer system in which the overhead can be neglected, the steps 40 and 44 may be omitted so as to issue the program interrupting instruction for each operation.

Next, referring to FIGS. 5 and 6, the operation of the program interrupt processing routine 23 will be described. FIG. 6 shows an address table 60 to which addresses corresponding to the identification codes (Id's) in the program interrupt processing routine 23 are set in the order thereof.

In step 50, the program recognizes the identification code (Id) passed as a parameter from the linkage procedure 16. Thereafter, based on the address table 60, an address corresponding to the identification code (Id) is obtained (step 52). For example, in a case of Id=m, the address (XXX) of the "KSUBm" routine 17 is attained. In step 54, by use of the obtained address as information, control is returned to the linkage procedure 16 which has issued the program interrupting instruction.

Through the operation above, the routine in the kernel 3 can be called from the driver 6.

Another feature of the operation will now be described. In the program interrupt processing routine 23, a call is issued to operate the "KSUBm" routine 17. In association therewith, the linkage procedure 16 need only issue a program interrupting instruction in any case. This method improves the processing speed as compared with the method in which the address of the required routine is attained for each operation and then the routine is called by use of the linkage procedure 16; however, as described in conjunction with FIG. 4, the overhead is increased when compared with the method in which only one operation is effected to obtain the address. This method nevertheless leads to an effect that a sequence of processing associated with the linkage procedure 16 and the program interrupt processing routine 23 is simplified.

(2) When data is written from the driver into an area of the kernel or when data is read from an area of the kernel Data read/write operation effected from the driver 5 on an area in the kernel 3 is basically the same as that effected when a routine in the kernel 3 is called from the driver 5. In consequence, description will be given mainly of several operations different therebetween.

Although not shown in the drawings, in order to access an area of the kernel 3 from the driver 5, there are prepared the procedures GETDATA and PUTDATA. GETDATA is a procedure employed by the driver 5 to read data from an area of the kernel 3, whereas PUTDATA is used to write data in the area.

From an object program 5 of a driver in which such procedures are described, the linkage editor 7 produces a load module 26. In the load module 26 of the driver 6, there are incorporated as a linkage procedure 16 portions of the linkage library 12 corresponding to GETDATA and PUTDATA. On the other hand, CALL GETDATA written in the driver 5 is translated in to call ZZZ (ZZZ indicates a first address of a linkage procedure associated with GETDATA) in the load module 6 of the driver.

The operations above are the same as those accomplished when a routine is called.

Figure 7:
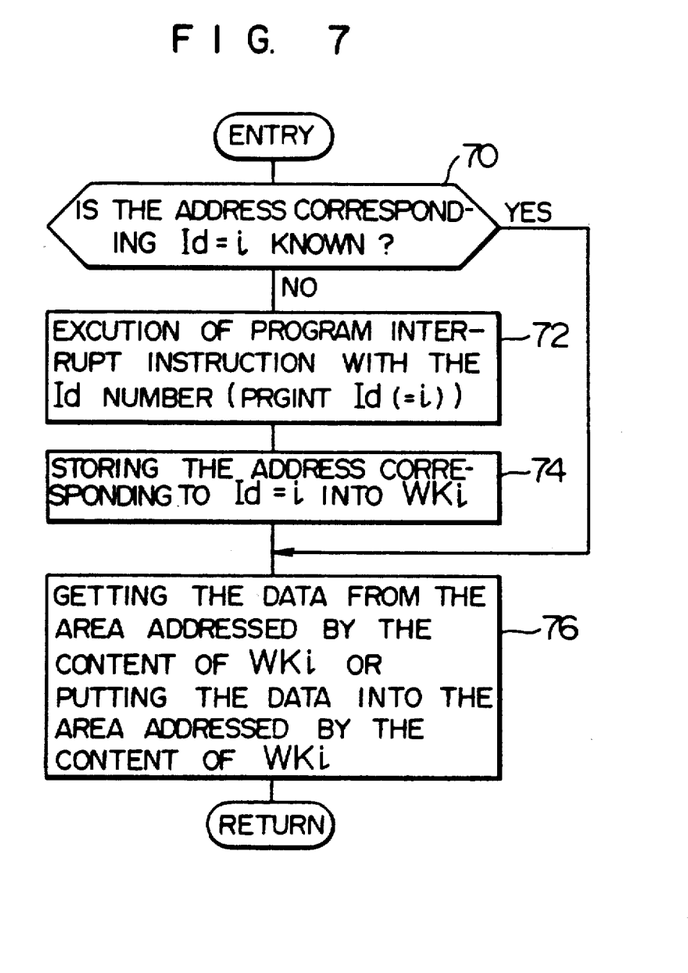
FIG. 7 is a flowchart showing an operation of the linkage library in a case of an area access.

Referring now to FIG. 7, description will be given of the operations of the linkage procedure corresponding to GETDATA and PUTDATA.

Figure 4:
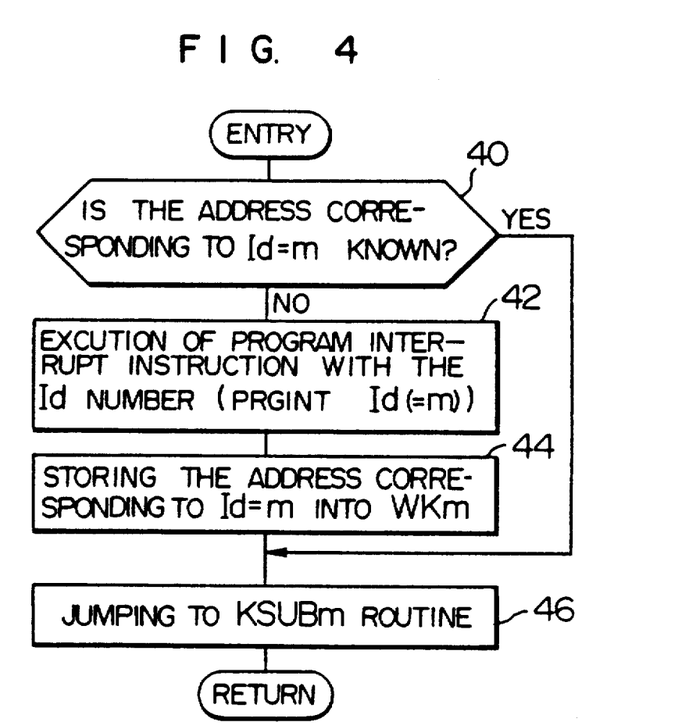
FIG. 4 is a flowchart showing an operation of the linkage library in a case of a routine call.

Since processing of steps 70 to 74 are similar to the processing of the steps 40 to 44 of FIG. 4, description thereof will be omitted. In step 76, by using as an address the content of a work area WKi to which an access address has been set in the step 74, data is read in a case of GETDATA and data is written in a case of PUTDATA.

Figure 5:
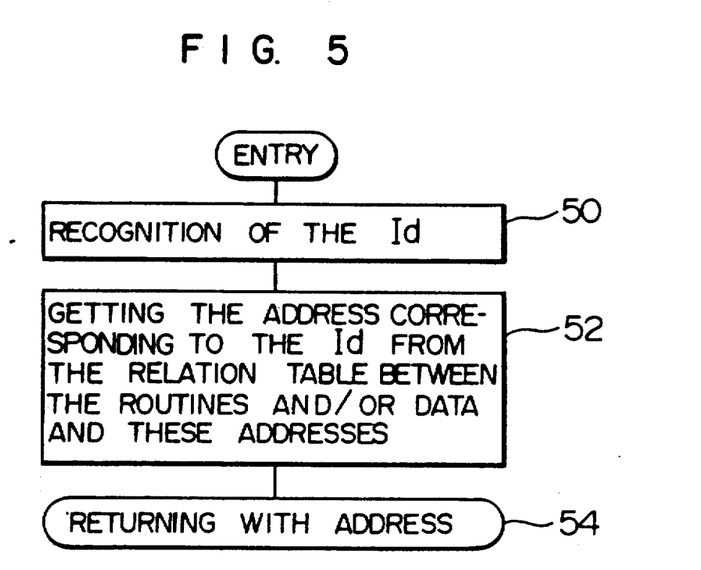
FIG. 5 is a flowchart showing an operation of the program interrupt processing.
Figure 6:
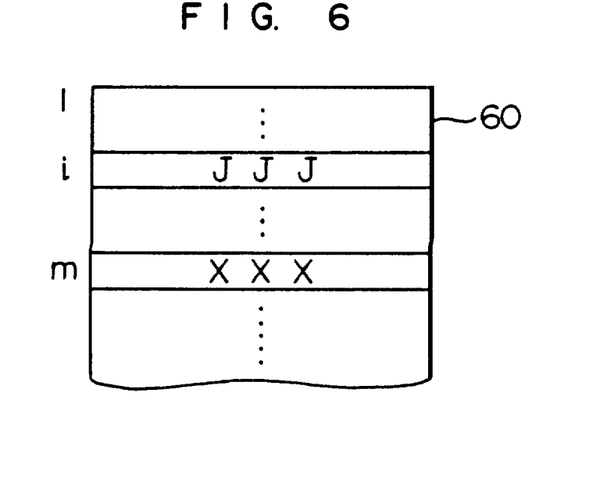
FIG. 6 is an address table of a routine and/or area in a kernel.

The operation of the program interrupt processing routine 23 corresponding to the operation above is identical to the content of the description already given in conjunction with FIGS. 5 and 6, and hence description thereof will be omitted.

Through the operations above, an access from the driver 6 to an area in the kernel of the load module 4 is possible, namely, data is written in the area and data is read therefrom.

(3) When a call is issued from the kernel 4 to the driver 6

Description will be given of the operation of this case with reference to FIG. 8, which shows in detail portions of FIG. 1 necessary for explaining the operation above.

In a case where a call is issued from the kernel of the load module 4 to the driver 6, the operation should be subdivided into two parts. In the first part, an address solution for the call to the driver 6 is executed when the computer system is set up (Immediately after the operating system is loaded in the main memory). In the second part, the driver 6 is actually called from the kernel.

(a) Address solution

First, description will be given of the reason why the address solution is required to be achieved when the setup or initiation is achieved on the computer system. In the setup operation of the computer system, the operating system is loaded in the main memory so as to set the system to a state capable of coping with interruptions from input/output devices. Consequently, in a case where the address solution has not been effected at the setup of the computer system, since the routine to operate in association with interruptions from the input/output devices is in kernel of the load module 4, when the routine calls the driver 6, a wrong address is accessed as a result, which may lead to a program runaway in some cases. In order to avoid this disadvantage, the address solution is conducted at the setup of the computer system. In the setup operation of the computer system, the reset state is first established and then the loading of the operating system and the initialization of the respective tables in the operating system are effected in an interrupt disabled state; in consequence, as a portion of the processing above, there is operated the driver table initializing routine 24, which will be described in the following paragraphs.

Figure 8:
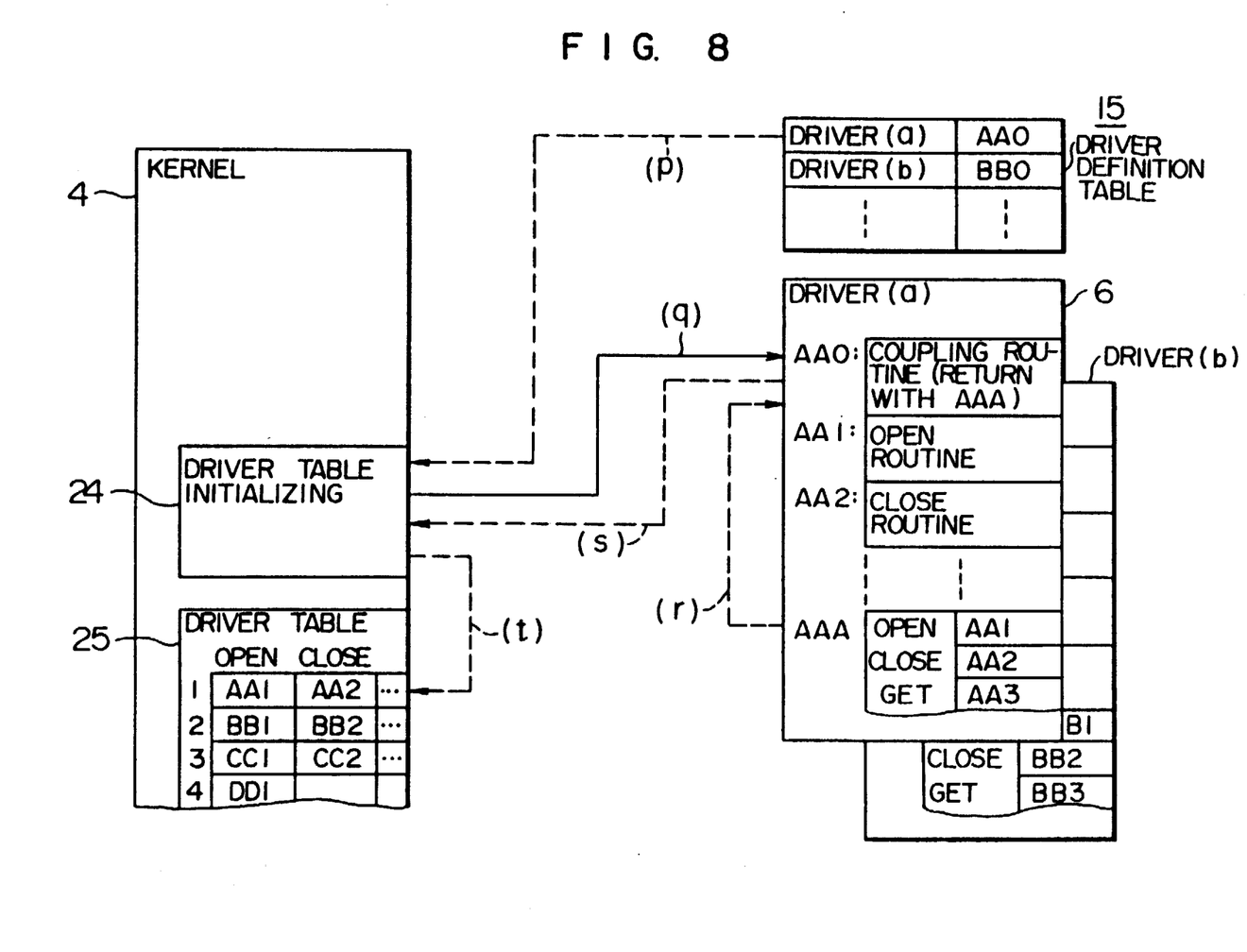
FIG. 8 is a schematic diagram for explaining a calling method of a call from a kernel to a driver.

In FIG. 8, a driver definition table 25 is disposed to store therein the first addresses of routines corresponding to the various functions such as open, close, get, and put functions of the driver 6 in an order of the identification (Id) codes.

In the description above, there has not been explained that the driver 6 includes a plurality of functions because such a description is not required and may complicate the description.

As shown in FIG. 8, the driver definition table 25 includes information pairs each comprising a driver name (the name need not be necessarily assigned, namely, information such as an identification code may be specified) and a first address of a coupling routine, which will be described later. The address of this table 15 is recognized by the kernel of the load module 4 in a predetermined fashion.

The constitution of the driver 6 includes a table containing the coupling routine, the routines associated with the respective functions of the open, close, get, and put functions, and the first addresses of these routines.

The addresses stored in the driver definition table 15 and the first addresses of the routines associated with the respective functions in the driver 6 are subjected to the address solution, when a linkage operation is achieved by the linkage editor 7, so as to be stored in the respective locations.

In FIG. 8, a solid line with an arrow mark and a broken line with an arrow mark represent a subroutine call and a data flow, respectively. These operations of the processing are effected by the driver table initializing routine 24.

Figure 9:
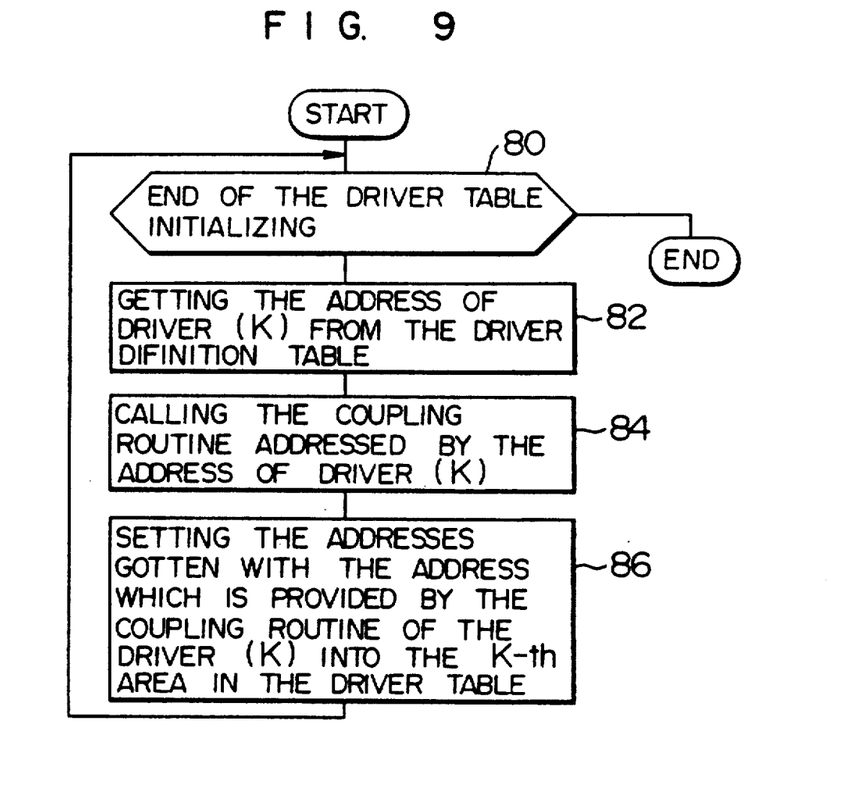
FIG. 9 is a flowchart showing an operation of the driver table initialization from a kernel.

Referring next to FIG. 9, the operation of the driver table initializing routine 24 will be described.

Step 80 judges to determine the termination of the driver table initializing routine 24. That is, for all drivers 6 thus added thereto, it is checked to determine whether or not the driver table 25 is completely generated. Naturally, if the table generation is finished, the operation of this routine 24 is terminated. In step 82, an address of a driver (k) is obtained from the driver definition table 15, where (k) indicates that the object of the processing is the driver (k). In addition, the address of the driver (k) is, as described above, the first address of the coupling routine of the driver (k). The processing of step 82 is designated by use of a broken line with an arrow mark (p) in FIG. 8.

In step 84, a call is issued to the coupling routine of the driver (k). This processing is represented by a solid line with an arrow mark (q) in FIG. 8. In FIG. 8, it is assumed that k is identical to a.

The coupling routine thus called sets, as shown in FIG. 8, a first address (AAA for k=a) of the table in which the first address of each functional routine of the driver (k) is stored and thereafter only executes a return instruction. This processing is represented by broken lines each having an arrow mark (r) and (s) in FIG. 8.

In step 86, from the table storing the first address of each functional routine of the driver (k), the content thereof is transferred to an area corresponding to the driver (k) in the driver table 25. The processing portion associated with the storage is indicated by a broken line with an arrow mark (t) in FIG. 8.

By conducting the operations from the step 80 to the step 86 for all drivers, the address solution is accomplished for all drivers added thereto in association with the case where the driver 6 is called from the kernel of the load module 4.

(b) Call issued from the kernel to the driver

Since the first address of each routine of the driver 6 is already stored in the driver table 25, it is only necessary to issue a call by use of the address stored in the driver table 25. In the most favorable case, the call can be effected with an instruction by use of an indirect addressing method.

Through the operations above, the address solution is effected in a case where a call is issued from the kernel of the load module 4 to the driver 6; furthermore, the execution thereof does not cause any wrong operation.

In the description of the sequence of operations above, there have not been described the data write and read operations to be achieved from the kernel onto an area in the driver for the following reasons. That is, in general, the driver is called from the kernel and applications and can be called in a duplicated fashion, the program structure of the driver is required to be a reentrant structure. However, in a case where the driver possessed data, if duplicated calls are issued thereto, the data may be possibly rewritten or destroyed by mistake. In order to prevent such an adverse operation, data is not located in the driver in an ordinary case. If data is to be possessed in the driver, an access from the kernel to the data can be effected in a similar fashion to that of the operation employed to call the driver, which will not require any particular explanation.

Figure 10:
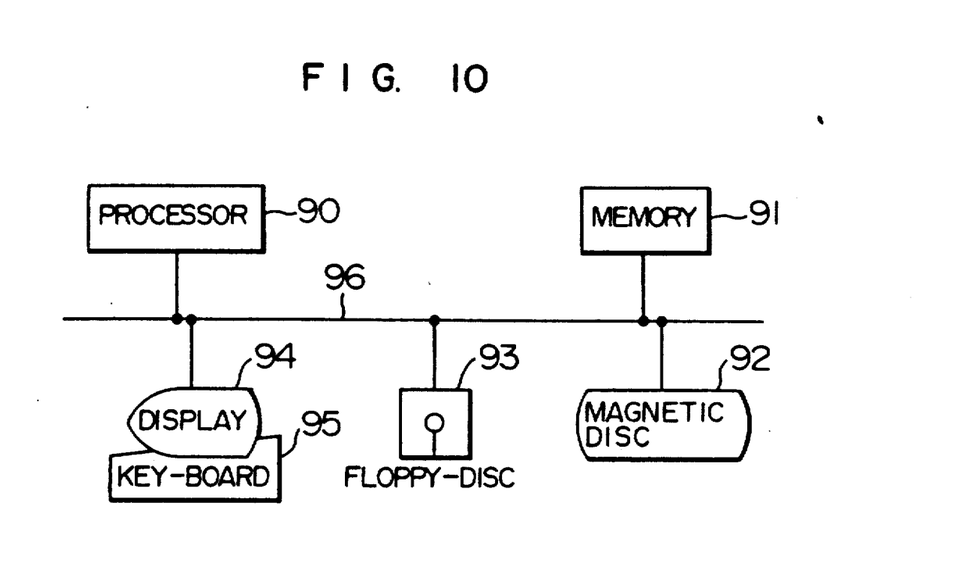
FIG. 10 is a configuration diagram showing a computer system to which the present invention is applied.

FIG. 10 shows an example of a configuration of a computer system to which the present invention is applied. In this configuration, a processor 90, a memory 91, a magnetic disk device 92, a floppy disk device 93, display equipment 94, and a keyboard 95 are interconnected via a bus 96 to each other.

In the computer system like that shown in FIG. 10, an operating system thereof is generally generated as follows.

Object modules of the respective programs constituting the kernel, the driver, an other operating system components are beforehand created on a floppy disk 93. Next, an execution of a linkage editor is effected by use of the processor 90 so as to link the object modules above such that the result of the linkage operation is stored on a magnetic hard disk 92. The states of these operations are indicated by means of the display 94, so that information to be externally supplied to the linkage editor is inputted from the keyboard 95.

Although description has been given of a computer environment for generating an operating system in quite a general case, this is also similar to the environment associated with the present invention. Moreover, it is assumed that the object modules are beforehand stored on a floppy disk 93, the magnetic disk 92 may also be employed for the storage. The storage and management of the object modules and load modules are effected by use of a floppy disk and a magnetic disk in the unit of files corresponding to the respective modules and hence do not depend on the storage location, namely, the storage device or the storage medium of each file.

The load module of the generated operating system is loaded, when the computer system is initiated, in the memory 91 so as to be executed by the processor 90.

According to the present invention, without necessitating the special compiler, linkage editor, and hardware necessary for the dynamic link method, namely, by use of the same software as that employed in the conventional static link method, there can be provided a driver incorporation method in which a driver can be incrementally added to an operating system, which leads to an effect that a combination of the drivers, in the operating system can be changed depending on the individual user's need.

We claim:

1. In a computer system, a method of generating an operating system by the computer system including generating a load module of the operating system from object modules of a kernel program and a plurality of driver programs by a static link-editor, the method comprising the steps of:

linking object modules of a kernel program to prepare a first load module, said kernel program including a plurality of kernel subroutine programs, an interrupt-processing program, a driver table initializing program and a driver table;

linking object modules of a plurality of driver programs, a linkage library and a driver definition table to prepare a second load module, the object modules of each of said driver programs including a read/write sequence having a read/write instruction for reading or writing data in a working area of said kernel program, and the object module of said linkage library including a read/write linkage procedure for executing said read/write instruction;

linking each of said driver programs and said read/write linkage procedure according to the read/write sequence in each of said driver programs;

rewriting a portion of said read/write instruction including said read/write sequence into a starting address of said read/write linkage procedure linked to said step of linking each of said driver programs and said read/write linkage procedure, wherein read/write linkage procedure interrupts to said kernel subroutine program controlling said working area are started from a predetermined starting address of the load module corresponding to execution of said read/write sequence;

storing addresses corresponding to each of said driver programs to said driver table of said first load module by referring to said driver definition table when said driver table initializing program is executed; and storing addresses corresponding to one of said kernel subroutine programs to said driver program by executing said interrupt processing program upon a call sequence for calling one of said kernel subroutine programs when said driver program is executed.

2. In a computer system, a method of generating an operating system by the computer system including generating a load module of the operating system from object modules of a kernel program and a plurality of driver programs by a static link-editor, each of said driver programs including a plurality of driver-function subroutine programs and coupling-routine programs for executing one of driver-function subroutine programs corresponding to a call from said kernel program, said kernel program including a driver call sequence for calling one of a plurality of driver-function subroutines and a driver function subroutine table for storing a starting address of each of said driver function subroutine programs, said driver call sequence including a name of the driver program and a name of the driver-function subroutine program in said driver program, and said object modules including a driver-definition information table for indicating a relationship between each name of said driver program and each of said starting addresses of said coupling routine programs in each of said driver programs, the method comprising the steps of:

linking object modules of a kernel program to prepare a first load module, said kernel program including a plurality of kernel subroutine programs, an interrupt-processing program, a driver table initializing program and a driver table;

linking object modules of a plurality of driver programs, a linkage library and a driver definition table to prepare a second load module;

storing addresses corresponding to each of said driver programs to said driver table of said first load module by referring to said driver definition table when said driver table initializing program is executed; and storing addresses corresponding to one of said kernel subroutine programs to said driver program by executing said interrupt processing program upon a call sequence for calling one of said kernel subroutine programs when said driver program is executed; and linking said driver-definition information table with other driver definition tables of said object modules, wherein said kernel program calls said coupling-routine program by referring to said driver-definition information table corresponding to execution of said driver function subroutine call sequence, and said coupling-routine program executes the driver-function subroutine program according to a calling of said kernel program, said coupling-routine program returns said starting address of said executed driver-function subroutine program to said kernel program after execution of said driver-function subroutine program, and said kernel program stores said returned starting address in said driver function subroutine table and executes said driver function subroutine program directly corresponding to execution of said driver call sequence for calling said driver function subroutine program again.

* * * * *